US012275260B2

(12) United States Patent
Raksha et al.

(10) Patent No.: US 12,275,260 B2
(45) Date of Patent: *Apr. 15, 2025

(54) SECURITY DEVICE FORMED BY PRINTING WITH SPECIAL EFFECT INKS

(71) Applicant: VIAVI SOLUTIONS INC., Chandler, AZ (US)

(72) Inventors: Vladimir P. Raksha, Santa Rosa, CA (US); Paul G. Coombs, Santa Rosa, CA (US); Charles T. Markantes, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,501

(22) Filed: Oct. 24, 2022

(65) Prior Publication Data

US 2023/0038496 A1 Feb. 9, 2023

Related U.S. Application Data

(60) Continuation of application No. 16/434,990, filed on Jun. 7, 2019, now Pat. No. 11,504,990, which is a (Continued)

(51) Int. Cl.
*B41M 3/14* (2006.01)
*B42D 25/29* (2014.01)
(Continued)

(52) U.S. Cl.
CPC .............. *B41M 3/14* (2013.01); *B41M 3/148* (2013.01); *B42D 25/29* (2014.10); *B42D 25/378* (2014.10); *B42D 25/369* (2014.10)

(58) Field of Classification Search
CPC ......... B41M 3/14; B41M 3/148; B42D 25/29; B42D 25/369; B42D 25/378; B41F 11/02
See application file for complete search history.

(56) References Cited

U.S. PATENT DOCUMENTS 1,299,484 A 4/1919 Lee
2,570,856 A 10/1951 Pratt et al.
(Continued)

FOREIGN PATENT DOCUMENTS

DE 4212290 5/1993
EP 341002 11/1989
(Continued)

OTHER PUBLICATIONS www.dictionary.com, defining "higher", pp. 1-7,2016.
(Continued)

*Primary Examiner* — Jill E Culler
(74) *Attorney, Agent, or Firm* — Mannava & Kang, P.C.

(57) ABSTRACT

A security device is disclosed that has an image formed upon a substrate. The image has a first printed region and a second different printed region both printed with a same ink formulation of field alignable flakes. At least one of the printed regions has optically variable effects. One of the first and second printed regions at least partially surrounds the other. The second printed region is formed of thin parallel lines and the first printed region has substantially wider lines than are printed in the second printed region. The area density of the ink in a line in the first group of wider lines is greater than the area density of a line in the second group of narrower lines. A surprising effect of this image is that particles or flakes in the ink are field aligned so as to produce a visible kinematic dynamic effect visible in the first region and not visible in the second region when the image is tilted or rotated.

20 Claims, 5 Drawing Sheets

Related U.S. Application Data division of application No. 11/676,012, filed on Feb. 16, 2007, now Pat. No. 10,343,436.

(60) Provisional application No. 60/777,086, filed on Feb. 27, 2006.

(51) Int. Cl.
*B42D 25/378* (2014.01)
*B42D 25/369* (2014.01)

(56) References Cited

U.S. PATENT DOCUMENTS

| | | | | |
|---|---|---|---|---|
| 3,123,490 | A | 3/1964 | Bolomey et al. | |
| 3,610,721 | A | 10/1971 | Abramson et al. | |
| 3,627,580 | A | 12/1971 | Krall | |
| 3,633,720 | A | 1/1972 | Tyle | |
| 3,676,273 | A | 7/1972 | Graves | |
| 3,790,407 | A | 2/1974 | Merten et al. | |
| 3,791,864 | A | 2/1974 | Steingroever | |
| 3,845,499 | A | 10/1974 | Ballinger | |
| 3,853,676 | A | 12/1974 | Graves | |
| 3,873,975 | A | 3/1975 | Miklos et al. | |
| 3,998,160 | A | 12/1976 | Pearce | |
| 4,011,009 | A | 3/1977 | Lama et al. | |
| 4,033,059 | A * | 7/1977 | Hutton | B42D 25/30 428/30 |
| 4,054,922 | A | 10/1977 | Fichter | |
| 4,099,838 | A | 7/1978 | Cook et al. | |
| 4,197,563 | A | 4/1980 | Michaud | |
| 4,271,782 | A | 6/1981 | Bate et al. | |
| 4,398,798 | A | 8/1983 | Krawczak et al. | |
| 4,543,551 | A | 9/1985 | Peterson | |
| 4,588,212 | A * | 5/1986 | Castagnoli | G07D 7/12 428/156 |
| 4,715,623 | A | 12/1987 | Roule et al. | |
| 4,788,116 | A | 11/1988 | Hochberg | |
| 4,867,793 | A | 12/1989 | Franz et al. | |
| 4,931,309 | A | 6/1990 | Komatsu et al. | |
| 5,079,058 | A | 1/1992 | Tomiyama | |
| 5,079,085 | A | 1/1992 | Hashimoto et al. | |
| 5,177,344 | A | 1/1993 | Pease | |
| 5,192,611 | A | 3/1993 | Tomiyama et al. | |
| 5,223,360 | A | 6/1993 | Prengel et al. | |
| 5,364,689 | A | 11/1994 | Kashiwagi et al. | |
| 5,368,898 | A | 12/1994 | Akedo | |
| 5,424,119 | A | 6/1995 | Phillips et al. | |
| 5,474,814 | A | 12/1995 | Komatsu et al. | |
| 5,613,022 | A | 3/1997 | Odhner et al. | |
| 5,624,076 | A | 4/1997 | Miekka et al. | |
| 5,627,663 | A | 5/1997 | Horan et al. | |
| 5,630,877 | A | 5/1997 | Kashiwagi et al. | |
| 5,672,410 | A | 9/1997 | Miekka et al. | |
| 5,722,693 | A | 3/1998 | Wicker | |
| 5,744,223 | A | 4/1998 | Abersfelder et al. | |
| 5,811,775 | A | 9/1998 | Lee | |
| 5,991,078 | A | 11/1999 | Yoshitake et al. | |
| 6,033,782 | A | 3/2000 | Hubbard et al. | |
| 6,043,936 | A | 3/2000 | Large | |
| 6,068,691 | A | 5/2000 | Miekka et al. | |
| 6,103,361 | A | 8/2000 | Batzar et al. | |
| 6,114,018 | A | 9/2000 | Phillips et al. | |
| 6,168,100 | B1 | 1/2001 | Kato et al. | |
| 6,183,018 | B1 | 2/2001 | Braun et al. | |
| 6,357,800 | B1 | 3/2002 | Müller et al. | |
| 6,403,169 | B1 | 6/2002 | Hardwick et al. | |
| 6,549,131 | B1 | 4/2003 | Cote et al. | |
| 6,589,331 | B2 | 6/2003 | Ostertag et al. | |
| 6,643,001 | B1 | 11/2003 | Faris | |
| 6,649,256 | B1 | 11/2003 | Buczek et al. | |
| 6,692,031 | B2 | 2/2004 | McGrew | |
| 6,692,830 | B2 | 2/2004 | Argoitia et al. | |
| 6,749,777 | B2 | 6/2004 | Argoitia et al. | |
| 6,749,936 | B2 | 6/2004 | Argoitia et al. | |
| 6,759,097 | B2 | 7/2004 | Phillips et al. | |
| 6,808,806 | B2 | 10/2004 | Phillips et al. | |
| 6,815,065 | B2 | 11/2004 | Argoitia et al. | |
| 6,833,395 | B2 | 12/2004 | Rygas et al. | |
| 6,838,166 | B2 | 1/2005 | Phillips et al. | |
| 6,841,238 | B2 | 1/2005 | Argoitia et al. | |
| 6,902,807 | B1 | 6/2005 | Argoitia et al. | |
| 6,918,616 | B2 | 7/2005 | Lyen et al. | |
| 6,987,590 | B2 | 1/2006 | Phillips et al. | |
| 7,047,883 | B2 | 5/2006 | Raksha et al. | |
| 7,104,193 | B2 | 9/2006 | Adamczyk | |
| 7,311,043 | B2 | 12/2007 | Mayer et al. | |
| 11,504,990 | B2 * | 11/2022 | Raksha | B42D 25/29 |
| 2002/0182383 | A1 | 12/2002 | Phillips et al. | |
| 2003/0165637 | A1 | 9/2003 | Phillips et al. | |
| 2003/0190473 | A1 | 10/2003 | Argoitia et al. | |
| 2004/0009309 | A1 | 1/2004 | Raksha et al. | |
| 2004/0051297 | A1 | 3/2004 | Raksha et al. | |
| 2004/0105963 | A1 | 6/2004 | Bonkowski et al. | |
| 2004/0151827 | A1 | 8/2004 | Argoitia et al. | |
| 2005/0037192 | A1 | 2/2005 | Argoitia et al. | |
| 2005/0063067 | A1 | 3/2005 | Phillips et al. | |
| 2005/0106367 | A1 | 5/2005 | Raksha et al. | |
| 2005/0123755 | A1 | 6/2005 | Argoitia et al. | |
| 2006/0035080 | A1 | 2/2006 | Argoitia | |
| 2006/0081151 | A1 | 4/2006 | Raksha et al. | |
| 2006/0097515 | A1 | 5/2006 | Raksha et al. | |
| 2006/0151989 | A1 * | 7/2006 | Muke | B42D 25/29 283/67 |
| 2006/0194040 | A1 | 8/2006 | Raksha et al. | |
| 2006/0198998 | A1 | 9/2006 | Raksha et al. | |
| 2006/0263539 | A1 | 11/2006 | Argoitia | |
| 2007/0200002 | A1 | 8/2007 | Raksha et al. | |

FOREIGN PATENT DOCUMENTS

| | | |
|---|---|---|
| EP | 406667 | 1/1993 |
| EP | 556449 | 8/1993 |
| EP | 710508 | 5/1996 |
| EP | 0710574 | 5/1996 |
| EP | 953937 | 11/1999 |
| EP | 978373 | 2/2000 |
| EP | 1239307 | 9/2002 |
| EP | 1353197 | 10/2003 |
| EP | 1389537 | 2/2004 |
| EP | 1498545 | 1/2005 |
| EP | 1741757 | 1/2007 |
| GB | 1107395 | 3/1968 |
| GB | 1131038 | 10/1968 |
| JP | 63172779 | 7/1988 |
| WO | 88/07214 | 9/1988 |
| WO | 95/13569 | 5/1995 |
| WO | 00/08596 | 2/2000 |
| WO | 01/03945 | 1/2001 |
| WO | 01/53113 | 7/2001 |
| WO | 02/40599 | 5/2002 |
| WO | 02/40600 | 5/2002 |
| WO | 02/053677 | 7/2002 |
| WO | 02/090002 | 11/2002 |
| WO | 03/102084 | 12/2003 |
| WO | 04/024836 | 3/2004 |
| WO | 05/017048 | 2/2005 |

OTHER PUBLICATIONS www.dictionary.com, defining “area”, pp. 1-6,2016.
www.dictionary.com, defining “plane”, pp. 1-10, 2016.
“Special Effects and Topical Alphabets 100 Complete Forits” by Dan X. Solo, (c) 1978, p. 90.
Search Report for EP Appln No. 07003668 Feb. 4, 2013, 2 pages.
Argoitia and Witzman, Pigments Exhibiting Diffractive Effects, Soc. OfVac. Coaters, 45th Annual Tech. Conf. Proceed. (2002).
Argoitia et al, “Pigments Exhibiting Diffractive Effects”, Soc. ofVac. Coaters, 45th Annual Tech. Conf. Proceed. (2002).
Argoitia et al, “The concept of printable holograms through the alignment of diffractive Die:ments”, SPIE Conference on Document Security, Jan. 2004.

(56) References Cited

OTHER PUBLICATIONS

Coombs et al, "Integration of contracting technologies into advanced optical security devices", SPIE Conference on Document Security, Jan. 2004.
Dobrowolski et al, "Research on Thin Film Anticounterfeiting Coatings at the National Research Council of Canada", Annlied 0Dtics, vol. 28, No. 14, DD. 2701-17 (Jul. 15, 1989).
Halliday et al, "Fundamentals of Physics, Sixth Edition", p. 662, Jul. 2000.
Hardin, "Optical tricks designed to foil counterfeiters" OE Reports, No. 191, Nov. 1999.
Himpsel et al., "Nanowires by Step Decoration", Mat. Research Soc. Bul., p. 20-24 (Aug. 1999).
Llewellyn, "Dovids: Functional Beauty—discussion about holography", Paper, Film, and Foil Converter, Aue: 2002.
Lotz et al., Optical Layers on Large Area Plastic Films, Precision, Applied Films (Nov. 2001).
Powell et al, (ED.), Vapor Deposition, John Wiley & Sons, p. 132 (1996).
Prokes and Wang (Ed), "Novel Methods of Nanoscale Wire Formation", Mat. Reseach Soc. Bui. , DD 13-14 (Aug. 1999).
Van Renesse (Ed) "Optical Document Security" 2nd Ed., Artech House, 254, 349-69 (1997).

* cited by examiner

SECURITY DEVICE FORMED BY PRINTING WITH SPECIAL EFFECT INKS

CROSS-REFERENCE TO RELATED APPLICATIONS

This Application is a Continuation under 35 U.S.C. § 120 of co-pending U.S. patent application Ser. No. 16/434,990, filed Jun. 7, 2019, which is a Divisional of commonly assigned and co-pending U.S. patent application Ser. No. 11/676,012, filed Feb. 16, 2007, which claims priority of U.S. Provisional Patent Application No. 60/777,086 filed Feb. 27, 2006, entitled "Dynamic Appearance-Changing Optical Devices (DACOD) Printed In Shaped Magnetic Field And Printable Fresnel Structures", the disclosures of which are hereby incorporated by reference in their entireties.

FIELD OF THE INVENTION

This invention relates to printing security devices upon a substrate and more particularly relates to a security device printed in one or more print passes that utilizes special effect magnetically aligned ink printed different line thicknesses in different regions to form an image wherein certain optical effects are seen within all lines, and wherein other optical effects are only seen in some lines or such areas as pixels, dots, dashed lines, etc. of a printed image in the absence of magnification as function of line thickness.

BACKGROUND OF THE INVENTION

Optically variable devices are used in a wide variety of applications, both decorative and utilitarian, for example such devices are used as security devices on commercial products. Optically variable devices can be made in numerous ways to achieve a variety of effects. Examples of optically variable devices include the holograms imprinted on credit cards and authentic software documentation, colour-shifting images printed on banknotes, and enhancing the surface appearance of items such as motorcycle helmets and wheel covers. Security devices bearing printed images are applied to currency, travel documents, drivers' licenses, lottery tickets, and objects such as bottles containing pharmaceuticals or other products where authenticity and or security of the product or brand is very important.

Optically variable devices can be made as film or foil that is pressed, stamped, glued, or otherwise attached to an object, and can also be made using optically variable pigments. One type of optically variable pigment is commonly called a colour-shifting pigment because the apparent colour of images appropriately printed with such pigments changes as the angle of view and/or illumination is tilted. A common example is the "20" printed with colour-shifting pigment in the lower right-hand corner of a U.S. twenty-dollar bill, which serves as an anti-counterfeiting device.

Some anti-counterfeiting devices are covert, while others are intended to be noticed. Unfortunately, some optically variable devices that are intended to be noticed are not widely known because the optically variable aspect of the device is not sufficiently dramatic. For example, the colour shift of an image printed with colour-shifting pigment might not be noticed under uniform fluorescent ceiling lights, but more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetically alignable pigments that are aligned with a magnetic field after applying the pigment (typically in a carrier such as an ink vehicle or a paint vehicle) to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing a pattern of flaked magnetic particles in fluoropolymer matrix has been described. After coating a product with a composition in liquid form, a magnet with a magnetic field having a desirable shape was placed on the underside of the substrate. Magnetically orientable flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer. While the reoriented flakes did not, providing the appearance of a three dimensional pattern in the coating.

Special effect optically variable coatings may be in the form of flakes in a carrier or a foil and may be color shifting, color switching, diffractive, reflective, any combination of color shifting or color switching and diffractive, or may have some other desired feature. Field-alignable flakes or particles may include magnetic metallic, multi-layer metallic, magnetic flakes having an optical interference structure, magnetic effect pigments, magnetic optically variable, magnetic diffractive, and magnetic diffractive optically variable.

Printing with special effect inks can be done using a silk screen or can be done by any conventional means of applying ink to a substrate. In a preferred embodiment of this invention an intaglio ink process is used to apply the ink. Non-limiting examples include gravure, flexographic, and offset methods.

Although special effect coatings forming images are well known, this invention provides a novel an inventive structure that conveniently limits the perceived travel of a dynamic effect in an image thereby differentiating two regions printed with the same ink. Unexpectedly, while limiting the perceived dynamic effect, the optically variable effects are not limited to a single region.

It is an object of this invention to provide a printed security device that forms a image printed with the same ink, whereby two lined or pixilated regions having different width lines have different perceived optical effects based in differences in the cross sectional surface of the printed lines.

The inventors of this application have discovered that when plural parallel spaced lines printed in color shifting ink are very narrow or pixels are very small, that color shifting effects can be seen. The inventors have also discovered that when flakes within the ink forming these lines or pixels are magnetically aligned, the effects provided by the magnetic alignment by and large are not visible. Notwithstanding, the inventors have also discovered that if the line width or pixels size is increased sufficiently, both color shifting effects and effects associated with magnetic alignment is perceptible without magnification. This is also a convenient way in which to limit the perceived travel of a dynamic effect while using the same ink but varying thickness and height. Thus, it is the overall surface area of the ink across a printed line that determines whether features associated with its magnetic alignment can be perceived.

SUMMARY OF THE INVENTION

In accordance with a first aspect of the invention a security device is provided comprising an image formed upon a substrate having a first printed region and a second printed region, wherein both printed regions have visible optically variable effects, wherein one of the first and second printed regions are at least partially surrounded by the other, wherein a same ink formulation having field alignable flakes therein is applied to the first and second printed regions, wherein the second printed region is comprised of thin parallel lines or small pixels, wherein the first printed region is either a solid printed region or is comprised of substantially wider lines than are printed in the second printed region, and wherein particles or flakes in the ink are field aligned so as to produce a visible kinematic dynamic effect in the first region and not visible in the second region when the image is tilted or rotated, and wherein a contrast between the first and second printed regions as a function of a difference between the width of lines or pixels in the second region and the solid or lined first printed region, forms a discernible printed image.

In accordance with a first aspect of the invention a security device is provided comprising an image formed upon a substrate having a first printed region and a second printed region, wherein one region has visible optically variable effects, wherein one of the first and second printed regions are at least partially surrounded by the other, wherein a same ink formulation having field alignable flakes therein is applied to the first and second printed regions, wherein. the second printed region is comprised of thin parallel lines, wherein the first printed region is either a solid printed region or is comprised of substantially wider lines than are printed in the second printed region, and wherein particles or flakes in the ink are field aligned so as to produce a visible kinematic dynamic effect in the first region and not visible in the second region when the image is tilted or rotated, and wherein a contrast between the first and second printed regions as a function of a difference between the width of lines in the second region and the solid or lined first printed region, forms a discernible printed image.

In accordance with another aspect of the invention there is provided, a method of forming a security device comprising the steps of:

printing upon a substrate a first printed region and one or more second printed regions at least partially bordering the first printed region, wherein a same ink formulation having flakes therein is applied to the first and one or more second printed regions in lines of different thicknesses, and, or heights, wherein the printed lines in the first printed region are substantially wider and or higher, than printed lines in the one or more second printed regions, and wherein particles or flakes in at least some of the ink is field aligned so as to produce a visible kinematic effect when the image is tilted or rotated, and wherein a contrast between the first and second printed regions as a function of their contrasting line widths, forms a discernible printed image.

In accordance with another aspect of the invention there is provided, a method of forming a security device comprising the steps of:

printing upon a substrate a continuous non-interrupted line of variable width or variable height where magnetic particles do not have substantial tilt in shallow or narrow regions and do have a tilt under influence of applied magnetic field in the wide or tall areas.

The unexpected image that appears as a result of applying an ink and. aligning the ink in accordance with this invention is highly appealing. In accordance with the teachings of this invention a same ink formulation is printed at a same time on two regions of a substrate. The lined image in one region has lines of a different area density, and or different thickness than the other region. Both regions are exposed to a magnetic field. However, surprisingly, the magnetic effects are only visible in one of the regions. This invention provides a synergistic result. One would expect that if a field was applied to a same ink that the result would be the same, and that the magnetic effects would be seen in both regions. Another advantage of this surprising result is that the two images contrast one another, so that the kinematic effect appears to be enhanced juxtaposed to the stationary image that doesn't reveal kinematic effects. In a single printing step where both regions are printed simultaneously and without masking the effects of the magnetic field in either region a stark difference in magnetic effect visible in the two regions is present. In a preferred embodiment there is no visible magnetic kinematic effect in one region wherein the other region has a strong visible effect.

BRIEF DESCRIPTION OF THE DRAWINGS

Exemplary embodiments of the invention will now be described in conjunction with the drawings, in which.

DETAILED DESCRIPTION

In this application the term optically variable encompasses effects that are color shifting, color switching, diffractive, or kinematic. Color shifting and switching effects are effects that change or switch color with a change in viewing angle of angle of incident light. Kinematic effects are those wherein the viewer "appears" to see an aspect of the image move, or wherein the color in one region "appears" to switch colors with another region. In an image having kinematic effects the viewer appears to see motion or depth that would not be seen in a uniform coating that merely exhibited color shifting. In a kinematic image flakes are magnetically aligned such that they are not all uniformly aligned. Thus, tilting or rotating provides the illusion of movement or change.

The term "visible" used hereafter is to mean visible with the human eye; that is, out magnification.

The term "line" used here after is to encompass a straight or curved solid line, dotted line, dashed line or curved line.

Figure 1A:
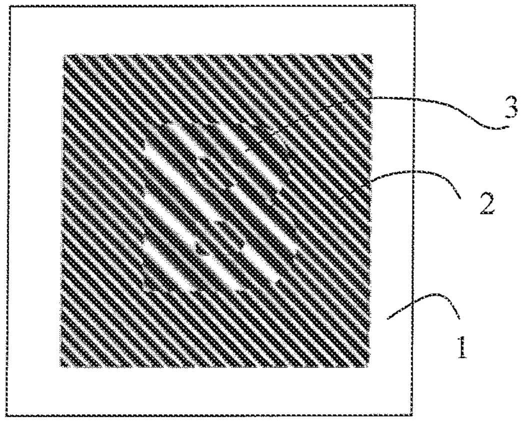
FIG. 1*a* is a plan view of a security device showing the letter "B" printed in thick lines and having a background that surrounds the "B" in thinner parallel lines.

The term "area density" is used hereafter to mean the mass per unit area defines as:

ρA where a. ρA=average area density b. M=total mass of the object c. A=total area of the object Referring now to FIG. 1*a* a security image is formed having a substrate 1 supporting a fine lined region 2, wherein parallel lines of ink are applied via a silk screen printing, gravure process or preferably an Intaglio printing process. The region 2 borders or surrounds region 3 which is a region having thick lines therein visually forming or occupying the space of a letter B. The thick printed lines spaced by gaps there between absent ink form the image of the letter B, surrounded by the uniform background of thin lines in region 2. Although in preferred embodiments of this invention the lines are preferably solid continuous lines, dotted lines may be used to form the image shown. In this instance is it preferable that the thicker lines be solid lines and the thinner lines be dotted or dashed wherein the spacing between the dots be very small so as to be seen by the viewer as continuous solid lines. A fine silk screen mesh can be used and holes can be selectively plugged or masked preventing ink from being printed. Of course printing can be done with an ink jet printer or any known means of applying optical effect inks in lines of varying thicknesses or area densities.

Figure 2:
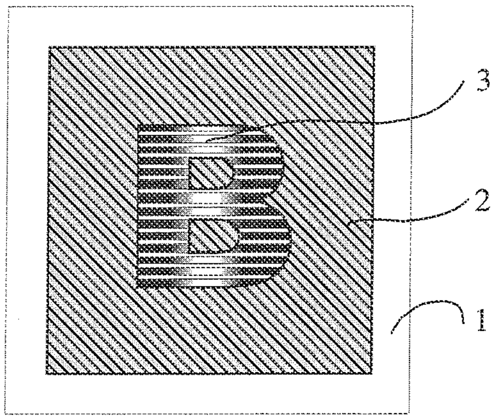
FIG. 2 is a plan view of an alternative embodiment of the invention wherein the letter "B" is printed in thick parallel lines in a first direction and wherein thinner parallel lines defining a background are at a different angle approximately 45 degrees to the thick parallel printed lines.
Figure 3A:
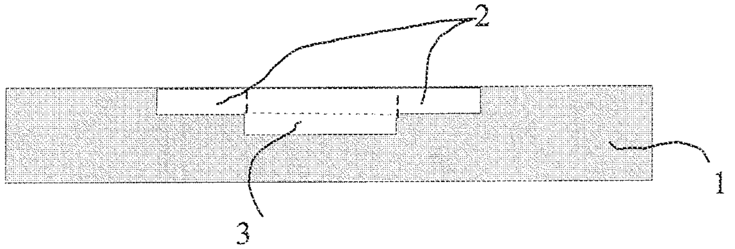
FIG. 3*a* is a cross-sectional view of a printing plate for the images in FIG. 2.

A similar arrangement is shown in FIG. 2, however in FIG. 2 the lines are not all parallel. In FIG. 2 the letter B consists of thick parallel printed lines, wherein the background consists of thin printed lines having gaps or space between that is greater than the width of the printed lines. Thus, the background region 3 appears as if it consists of thick white lines and thinner black lines. Notwithstanding the apparent white lines are unprinted areas in region 2. In preferred embodiments of this invention the width of the fine lines and wider lines differ significantly however the height of the printed lines also differs. As can be seen in FIG. 3 the region 2 and 3 of the printing plate have different depths wherein region 3 is twice as deep as region 2, for example. Thus when the print is made, the ink in region 3 has a height approximately twice the height of the ink in region 2. Therefore the thin lines are finer in both dimensions, width and height off the substrate. It is the total volume of ink of a particular line that determines the perceived effects. Color shifting or color switching is seen whether lines are fine lines or wide lines, and kinematic effect requires a greater volume of ink in a line or lines to be perceived.

Aside from the letter B being optically variable, the letter B in FIG. 2 also shows a dynamic kinematic effect in the form of a rolling bar through the mid-region of the letter B, Which appears as a bright bar. By tilting the image about an axis through the bright bar, the bar "appears" to move from right to left as the image is tilted in both directions. Such kinematic features are well know and are described in United States published patent application numbers 20060198998, 20060194040, 20060097515, 20060081151, and 20050123755 assigned to JDS Uniphase Corporation incorporated herein by reference.

Optical effect flakes can be aligned in a field, preferably a magnetic field to form many different type of kinematic effects. The more simple easily understood kinematic effects include the rolling bar and the flip-flop.

Figure 6:
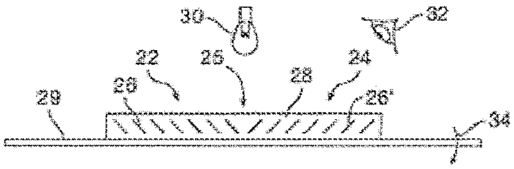
FIG. 6 is a prior art cross-sectional view of a flip-flop.

A flip-flop is shown in FIG. 6 illustrating a first printed portion 22 and a second printed portion 24, separated by a transition 25. Pigment flakes 26 surrounded by carrier 28, such as an ink vehicle or a paint vehicle have been aligned parallel to a first plane in the first portion, and pigment flakes 26' in the second portion have been aligned parallel to a second plane. The flakes are shown as short lines in the cross-sectional view. The flakes are magnetic flakes, i.e. pigment flakes that can be aligned using a magnetic field. They might or might not retain remnant magnetization. Not all flakes in each portion are precisely parallel to each other or the respective plane of alignment, but the overall effect is essentially as illustrated. The Figures are not drawn to scale. A typical flake might be twenty microns across and about one micron thick, hence the figures are merely illustrative. The image is printed or painted on a substrate 29, such as paper, plastic film, laminate, card stock, or other surface. For convenience of discussion, the term "printed" will be used to generally describe the application of pigments in a carrier to a surface, which may include other techniques, including techniques others might refer to as "painting".

Generally, flakes viewed normal to the plane of the flake appear bright, while flakes viewed along the edge of the plane appear dark. For example, light from an illumination source 30 is reflected off the flakes in the first region to the viewer 32. If the image is tilted in the direction indicated by the arrow 34, the flakes in the first region 22 will be viewed on-end, while light will be reflected off the flakes in the second region 24. Thus, in the first viewing position the first region will appear light and the second region will appear dark, while in the second viewing position the fields will flip-flop, the first region becoming dark and the second region becoming light, This provides a very striking visual effect. Similarly, if the pigment flakes are colour-shifting, one portion may appear to be a first colour and the other portion another colour.

The carrier is typically transparent, either clear or tinted, and the flakes are typically fairly reflective. For example, the carrier could be tinted green and the flakes could include a metallic layer, such as a thin film of aluminum, gold, nickel, platinum, or metal alloy, or be a metal flake, such as a nickel or alloy flake. The light reflected off a metal layer through the green-tinted carrier might appear bright green, while another portion with flakes viewed on end might appear dark green or other colour. If the flakes are merely metallic flakes in a clear carrier, then one portion of the image might appear bright metallic, while another appears dark. Alternatively, the metallic flakes might be coated with a tinted layer, or the flakes might include an optical interference structure, such as an absorber-spacer-reflector Fabry-Perot type structure. Furthermore, a diffractive structure may be formed on the reflective surface for providing an enhancement and an additional security feature. The diffractive structure may have a simple linear grating formed in the reflective surface, or may have a more complex predetermined pattern that can only be discerned when magnified but having an overall effect when viewing. By providing diffractive reflective layer, a colour change or brightness change is seen by a viewer by simply turning the sheet, banknote, or structure having the diffractive flakes.

The process of fabricating diffractive flakes is described in detail in U.S. Pat. No. 6,692,830, U.S. patent application publication number 20030190473, describes fabricating chromatic diffractive flakes. Producing a magnetic diffractive flake is similar to producing a diffractive flake, however one of the layers is required to be magnetic. In fact, the magnetic layer can be disguised by way of being sandwiched between A1 layers; in this manner the magnetic layer and then it doesn't substantially affect the optical design of the flake; or could simultaneously play an optically active role as absorber, dielectric or reflector in a thin film interference optical design.

Figure 7:
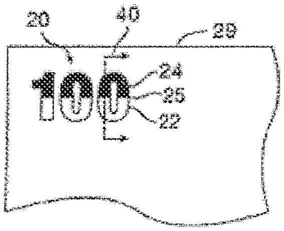
FIGS. 7 and 8 are simplified plan views of a flip-flop as seen from different angles.

FIG. 7 is a simplified plan view of the printed image 20 on the substrate 29, which could be a document, such as a bank note or stock certificate, at a first selected viewing angle. The printed image can act as a security and/or authentication feature because the illusive image will not photocopy and cannot be produced using conventional printing techniques. The first portion 22 appears bright and the second portion 24 appears dark. The section line 40 indicates the cross section shown in FIG. 1A. The transition 25 between the first and second portions is relatively sharp. The document could be a bank note, stock certificate, or other high-value printed material, for example.

Figure 8:
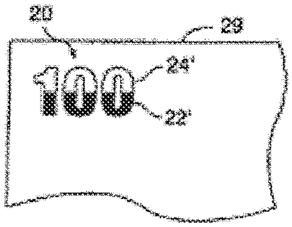

FIG. 8 is a simplified plan view of the printed image 20 on the substrate 29 at a second selected viewing angle, obtained by tilting the image relative to the point of view. The first portion 22 now appears dark, while the second portion 24 appears light. The tilt angle at which the image flip-flops depend on the angle between the alignment planes of the flakes in the different portions of the image. In one sample, the image flipped from light to dark when tilted through about 15 degrees.

Figure 9:
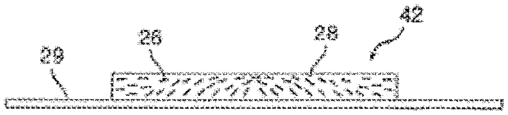
FIG. 9 is a prior art cross-sectional view of a rolling bar showing only some of the aligned. flakes.

FIG. 9 is a simplified cross section of a printed image 42 of a kinematic optical device that will be defined as a micro-arrayed cylindrical Fresnel reflector or as referred to as a "rolling bar" for purposes of discussion, according to another embodiment of the present invention. The image includes pigment flakes 26 surrounded by a transparent carrier 28 printed on a substrate 29. The pigment flakes are aligned in a curving fashion. As with the flip-flop, the region(s) of the rolling bar that reflect light off the faces of the pigment flakes to the viewer appear lighter than areas that do not directly reflect the light to the viewer. This image provides a Fresnel focal line that looks very much like a light band(s) or bar(s) that appear to move ("roll") across the image when the image is tilted with respect to the viewing angle (assuming a fixed illumination source(s).

Figure 10:
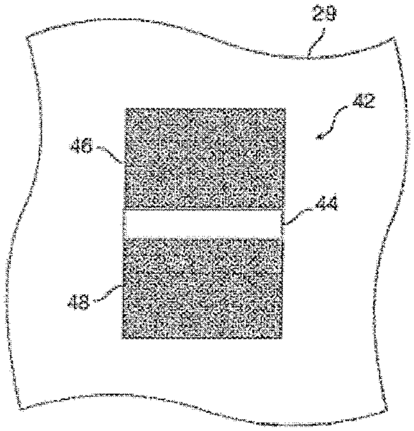
FIG. 10 is a top view of the rolling bar shown in FIG. 9.

FIG. 10 is a simplified plan view of the rolling bar image 42 at a first selected viewing angle. A bright bar 44 appears in a first position in the image between two contrasting fields 46, 48. FIG. 2C is a simplified plan view of the rolling bar image at a second selected viewing angle. The bright bar 44' appears to have "moved" to a second position in the image, and the sizes of the contrasting fields 46', 48' have changed. The alignment of the pigment flakes creates the illusion. of a bar "rolling" down the image as the image is tilted (at a fixed viewing angle and fixed illumination). Tilting the image in the other direction makes the bar appear to roll in the opposite direction (up).

The bar may also appear to have depth, even though it is printed in a plane. The virtual depth can appear to be much greater than the physical thickness of the printed image. It happens because the bar is a imaginary focal line of the cylindrical convex Fresnel reflector located at the focal length underneath the plane of the reflector. The tilting of the flakes in a selected pattern reflects light to provide the illusion of depth or "3D", as it is commonly referred to. A three-dimensional effect can be obtained by placing a shaped. magnet behind the paper or other substrate with magnetic pigment flakes printed on the substrate in a fluid carrier. The flakes align along magnetic field lines and create the 3D image after setting (e.g. drying or curing) the carrier. The image often appears to move as it is tilted; hence kinematic 3D images may be formed.

Flip-flops and rolling bars can be printed with magnetic pigment flakes, i.e. pigment flakes that can be aligned using a magnetic field. A printed flip-flop type image provides an optically variable device with two distinct fields that can be obtained with a single print step and using a single ink formulation. A rolling bar type image provides an optically variable device that has a contrasting band that appears to move as the image is tilted, similar to the semi-precious stone known as Tiger's Eye. These printed images are quite noticeable and the illusive aspects would not photocopy. Such images may be applied to bank notes, stock certificates, software documentation, security seals, and similar objects as authentication and/or anti-counterfeiting devices. They are particularly desirable for high-volume printed documents, such as bank notes, packaging, and labels, because they can be printed in a high-speed printing operation, as is described below.

Although embodiments of the invention described heretofore have been primarily concentrated on Intaglio, other methods of applying ink in accordance with this invention can be used. For example gravure, silk screen, flexo, letterpress and other known method of applying ink can be utilized. What is required is that ink be applied to different regions within a larger region in lines of varying thickness and lines of varying height; that is the depth and width of the lines will vary so as to provide contrasting regions.

For intaglio or gravure printing, the simplest method is for the engraving to have greater depth in a first region than in a contrasting second region.

For Flexo printing, variation in ink thickness is achieved using a dot screen or half-tone technique wherein larger dot size, equating to higher area coverage is used in the region of greater desired ink thickness. In the case of silk screen printing wherein a physical screen having uniform open areas is used, variation in height is achieved in a different manner In screen printing, the achievement of different ink height in the two or more regions is provided by throttling the transfer of ink through the screen via the masking of the screen itself. By selective masking of the screen, the first area has uninhibited ink transfer and therefore greater ink height off the substrate while the second area has a lesser degree of ink transfer and therefore lower ink height due to masking of the screen in a predetermined manner. For other printing techniques such as letterpress and offset, similar schemes are used wherein areas of greater and lesser ink thickness are provided. by varying the ink transfer by means of dot sizes or percent ink coverage on the plate or transfer medium.

In a preferred embodiment of the invention, the weight of the ink in a line of a length of one unit in the first region is at least three times the weight of the ink in a line of a same length in the second region. Preferably, the first region consists of a plurality of parallel printed lines of width $W_L$ and the second region consists of a plurality of parallel printed lines having a width of less than $W_L/2$, however in some instances the width of the lines in the second region may be orders of magnitude smaller than the width of the lines in the first region. Regardless of the exact ratio that is selected With regard to area density of ink in the two regions, a desired ratio is one wherein the narrow lines do not show visible magnetic or kinematic effects, while the wider and/or higher lines do exhibit visible kinematic effects.

Figure 1B:
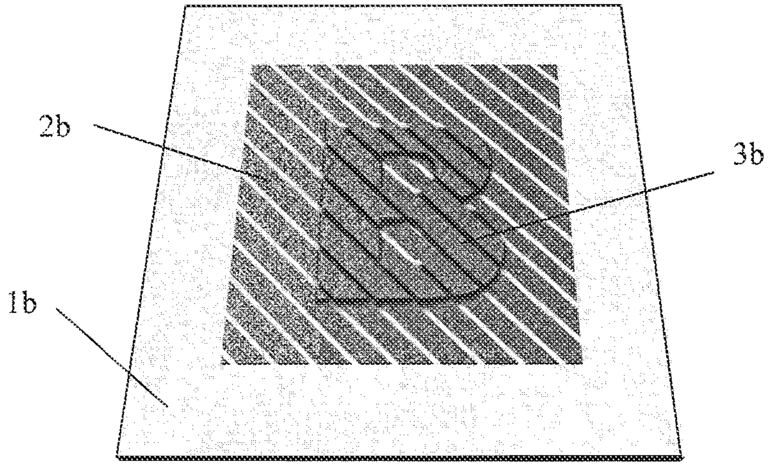
FIG. 1*b* is a plan view of an alternative embodiment wherein the letter "B" is printed with a thicker ink coating than the background.
Figure 3B:
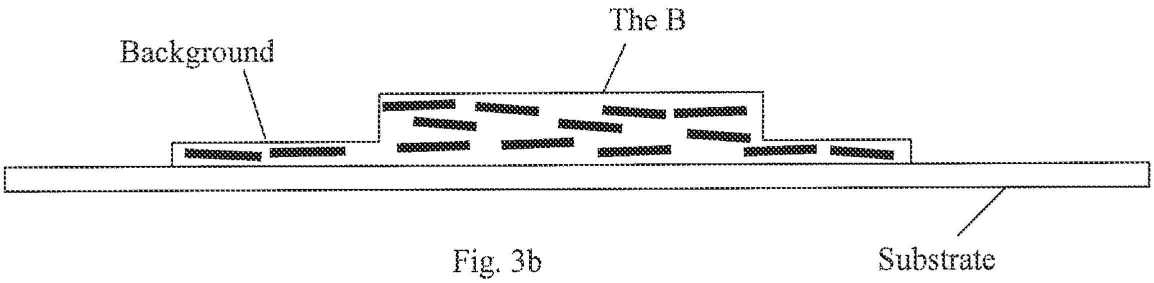
FIG. 3*b* is a cross-sectional view of the ink that is printed on the substrate using the printing plate in FIG. 3*a* before applying a magnetic field to align the flakes.

FIG. 1*b* shows an alternative embodiment of the invention wherein the letter "B" shown as 3*b* and it's background 2*b* are printed in lines of a same width on substrate 1*b*. However, the "B" is printed in ink that is considerably thicker than the ink forming the background. The image was printed with a printing plate (Intaglio) or with gravure cylinder having a gradient of engravings. Engravings forming the B are deeper than engravings forming the background 2*b* as shown in FIG. 3*b*. As a result, the lines of the background 2*b* are shallow and contain small amount of a pigment. In contrast, the lines 3*b* forming the B are thicker and contain greater number of pigment particles per unit of the substrate area as shown in FIG. 3*b*.

Figure 4:
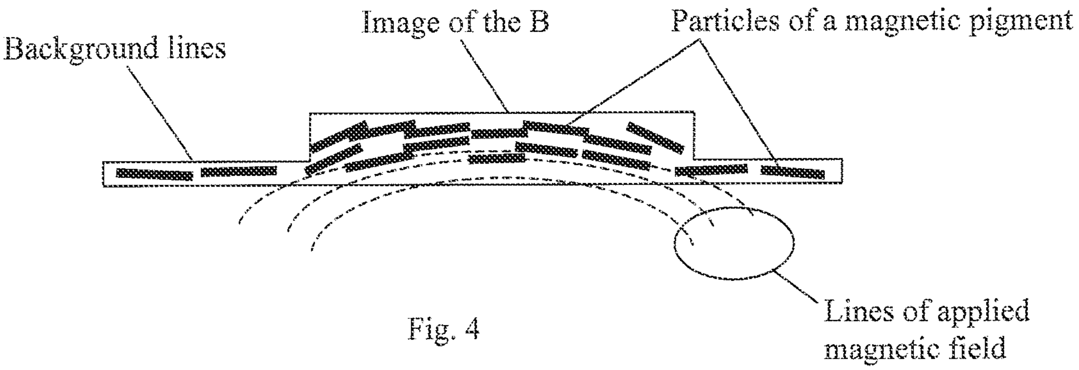
FIG. 4 is the cross-sectional view of FIG. 3*b* illustrating the orientation of the flakes in an. applied magnetic field.
Figure 5:
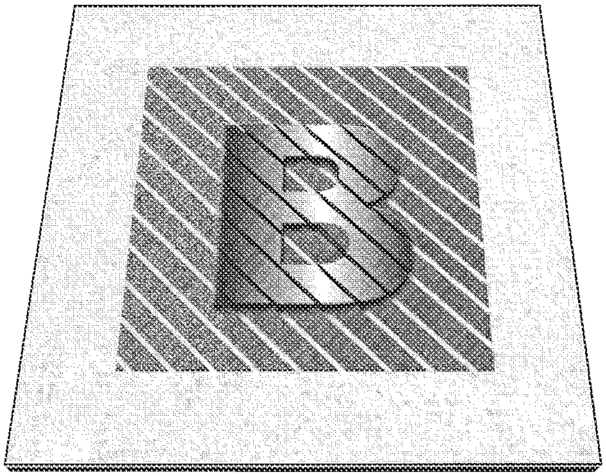
FIG. 5 is the perspective view of the image of FIG. 3*b* after the magnetic field has been applied.

FIG. 4 illustrates the orientation of the flakes 4*b* in an applied magnetic field 5*b*. Being dispersed in a liquid ink vehicle and placed in a curved magnetic field, the particles 4*b* rotate in the ink vehicle until they become aligned along the lines of the field as shown. The process of rotation occurs in these regions of the print where the ink vehicle has enough space for it. Usually these are the places where the ink is printed with deep engravings. The shallow lines of the background do not have room enough for the particles to rotate and align along the lines. They stay almost flat. As a result, the image of the B gets a kinematic optical effect shown in FIG. 5 while the background does not have it.

In an alternative embodiment not shown in the figures the letter "B" is printed. with a solid unlined coating whereby one thick line forms the letter "B". Hence, the letter "B" is not made up of parallel lines however the background is and the same effects are present as in other embodiments.

Numerous other embodiments of the invention may be envisaged without departing from the scope of this invention. For example in an embodiment not shown, a first fine lined coating is applied to the bottom of a light transmissive substrate and wherein a wider lined coating representing the letter B is on the top side of the substrate. Conveniently the tine lined coating can cover the entire bottom for ease of printing. The wide "B" is printed on the other side of a light transmissive substrate.

The invention claimed is:

1. A method of forming a security device comprising:

printing upon a substrate a first printed region and one or more second printed regions at least partially bordering the first printed region, wherein a same ink formulation having magnetically-alignable flakes therein is applied to the first and one or more second printed regions, and applying a curved magnetic field so that the flakes in the first printed region are aligned in a convex or concave shape in a cross-section of a vertical plane of the first printed region, wherein the flakes in the one or more second printed regions are not aligned along the curved magnetic field applied to the second printed regions.

2. A method as defined in claim 1, wherein the printing is intaglio printing.

3. A method as defined in claim 1, wherein the ink formulation having magnetically-alignable flakes therein is applied to the first and one or more second printed regions in lines of different heights.

4. A method as defined in claim 3, wherein the printed lines in the first printed region are substantially higher than printed lines in the one or more second printed regions.

5. A method as defined in claim 4, wherein a contrast between the first and second printed regions as a function of their contrasting line heights forms a discernible printed image.

6. A method as defined in claim 1, wherein the method produces an image having a visible kinematic effect in the first printed region when the image is tilted or rotated.

7. A method as defined in claim 1, wherein the first region and one or more second printed regions are printed without masking the effects of the magnetic field.

8. The method as defined in claim 1, wherein printing the first printed region includes printing a plurality of printed lines that are at least twice as wide as printed lines of the one or more second printed regions.

9. The method as defined in claim 1, wherein printing the second printed region includes printing parallel lines or pixels in the second printed region, the parallel lines being less than half as wide as the printed lines of the first printed region.

10. The method as defined in claim 1, wherein printing a first printed region includes printing a plurality of printed lines that are at least twice as deep as printed lines of the second region.

11. The method as defined in claim 1, wherein an area density of the ink of the one or more second printed regions is less than an area density of the ink of the first printed region.

12. The method as defined in claim 1, wherein the flakes are chosen from color shifting flakes, color switching flakes and diffractive flakes.

13. The method as defined in claim 1, wherein a rolling bar is seen in the first printed region without magnification upon tilting, and wherein the rolling bar is not seen without magnification in the one or more second printed regions upon tilting.

14. The method as defined in claim 1, wherein the printed lines in the first printed region are at a 45° angle to the printed lines in the one or more second printed regions.

15. A method of forming a security device comprising:

printing upon a substrate a continuous, non-interrupted line of ink of variable width regions or variable height regions, the variable width regions have wide areas and narrow areas that are not as wide as the wide areas, and the variable height regions having tall areas and shallow areas that are not as deep as the shallow areas, the ink comprising magnetic particles, applying a magnetic field to the line of ink, wherein the magnetic particles do not align with the magnetic field so as to have substantial tilt in the shallow areas or narrow areas under the influence of the applied magnetic field and do have a tilt in the wide areas or tall areas under the influence of the applied magnetic field.

16. A method as defined in claim 15, wherein the variable width regions or variable height regions are printed without masking the effects of the magnetic field.

17. The method as defined in claim 15, wherein the continuous, non-interrupted line has a variable height region.

18. The method as defined in claim 15, wherein the continuous, non-interrupted line has a variable width region.

19. A method as defined in claim 15, wherein the printing is intaglio printing.

20. A method as defined in claim 15, wherein the method produces an image having a visible kinematic effect in the wide or tall areas when the image is tilted or rotated.

* * * * *